United States Patent Office 3,447,219
Patented June 3, 1969

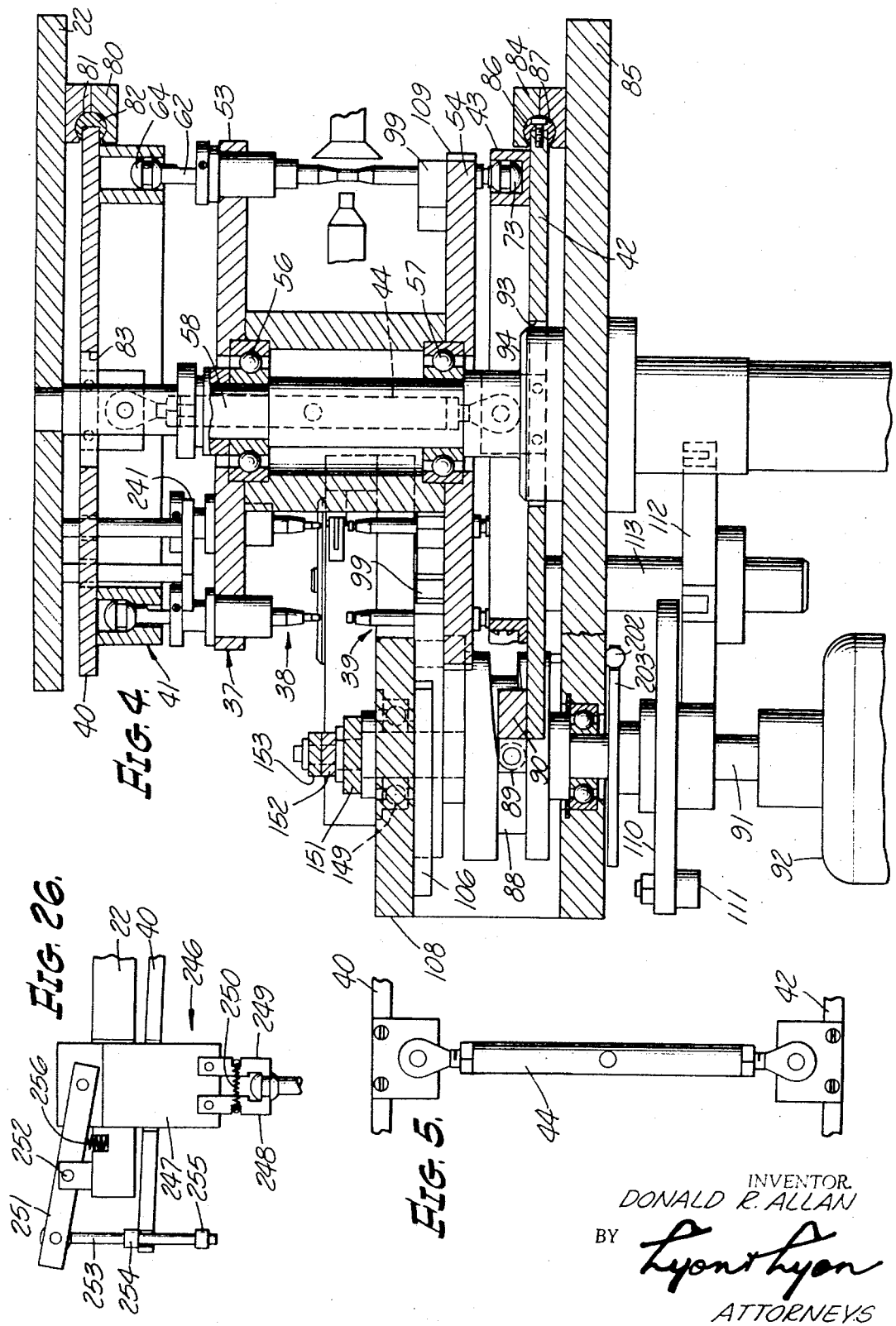

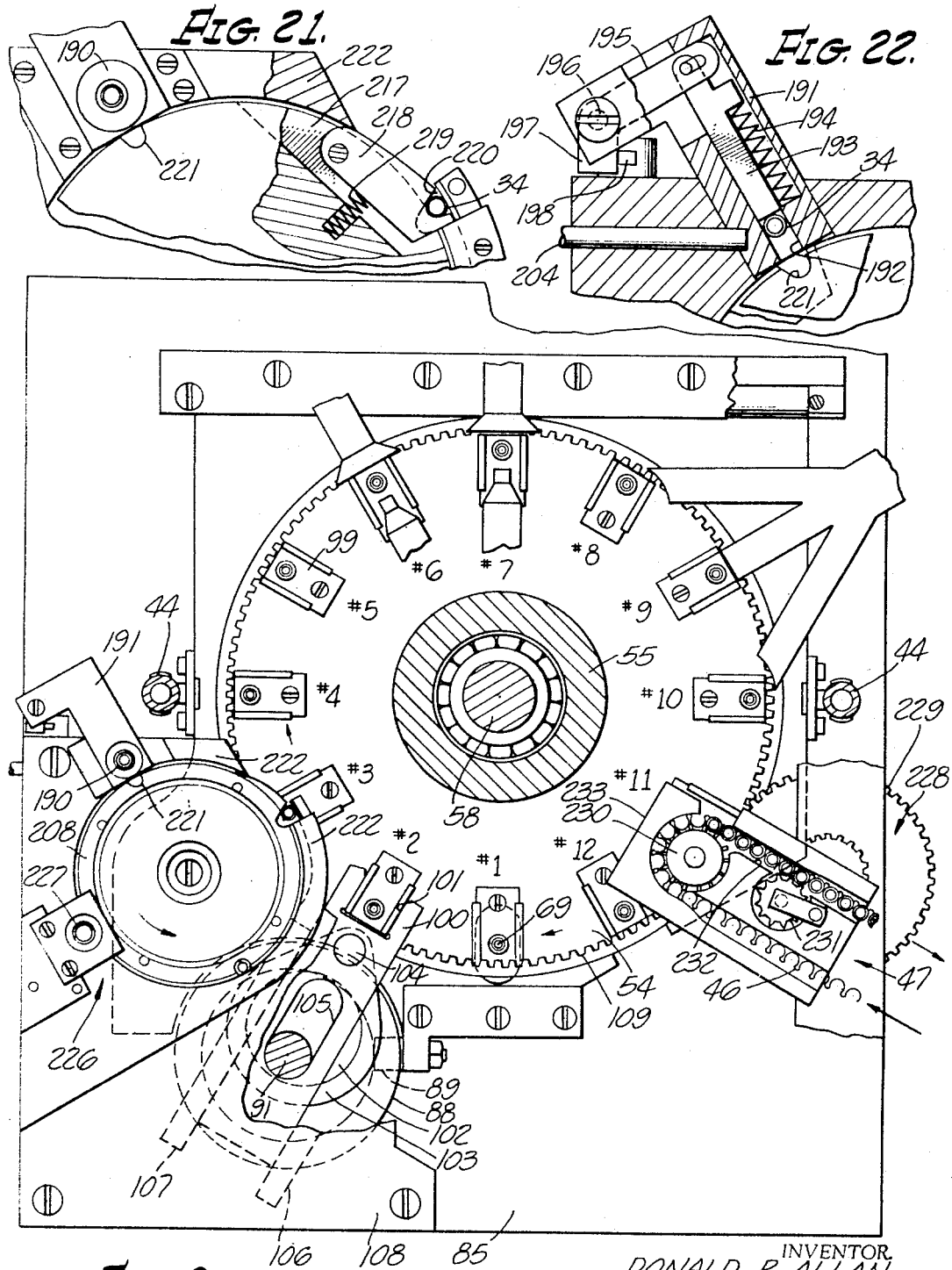

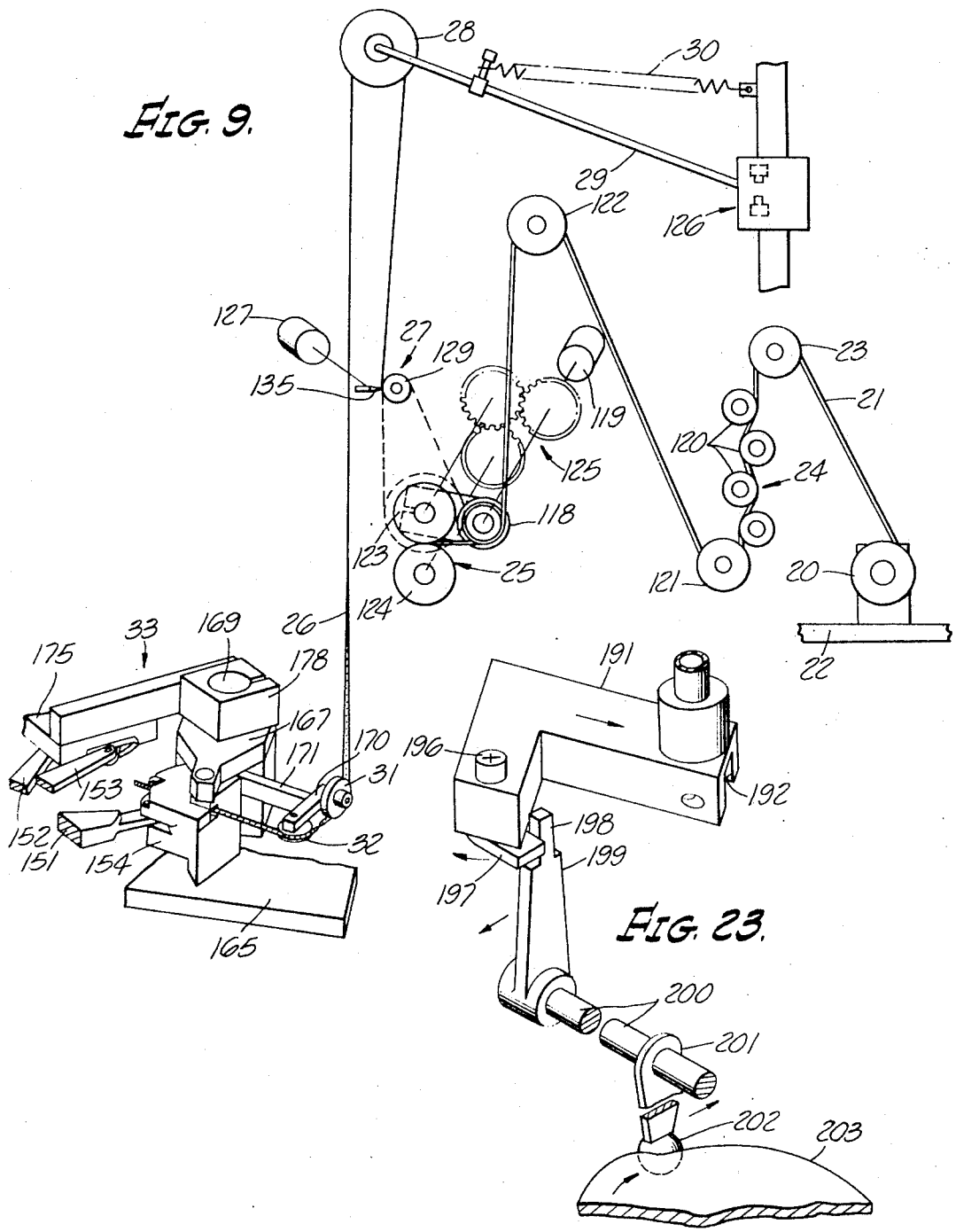

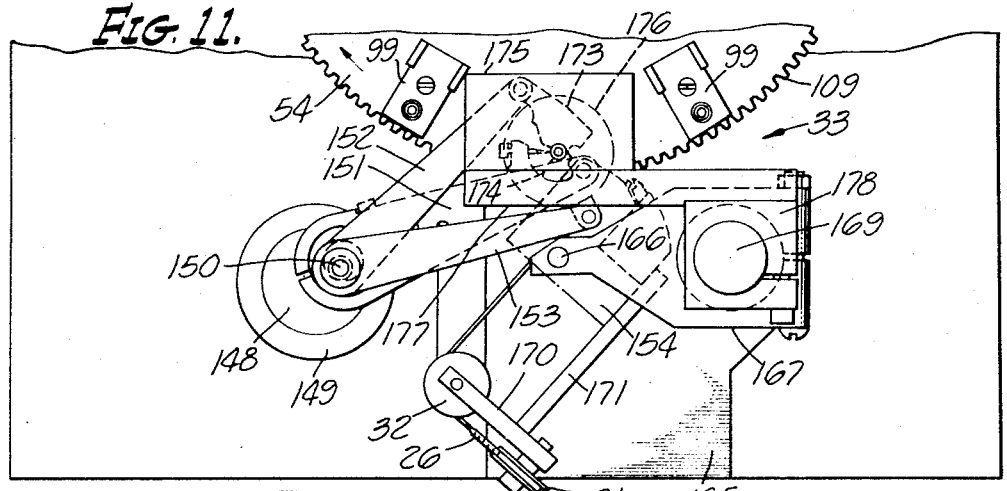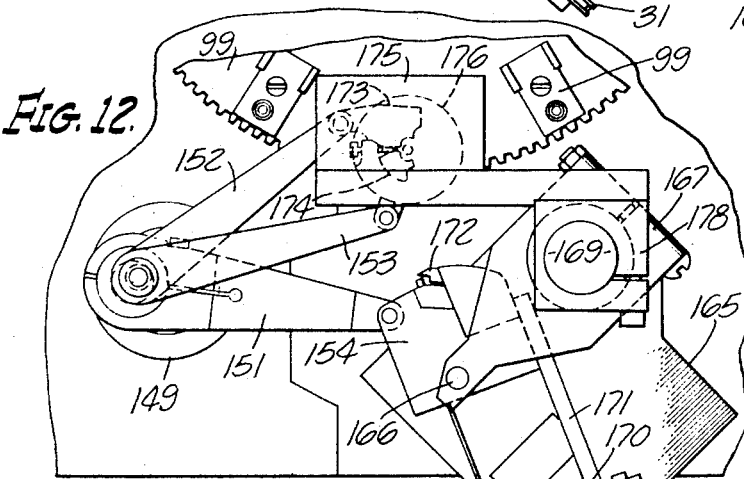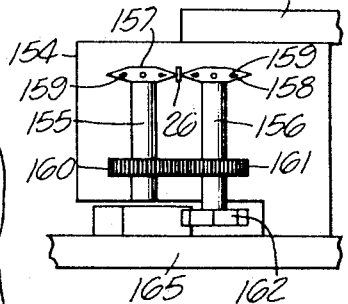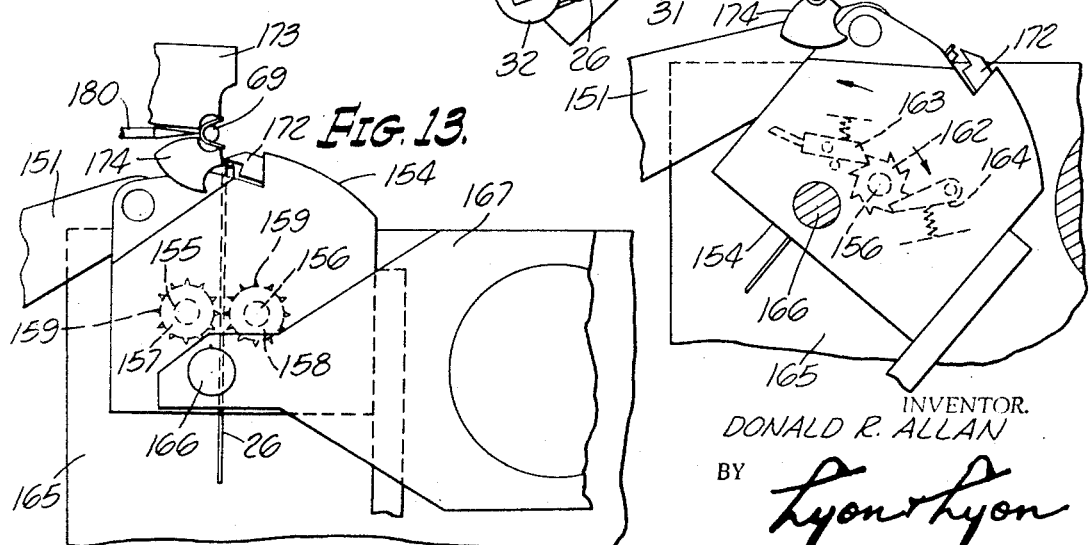

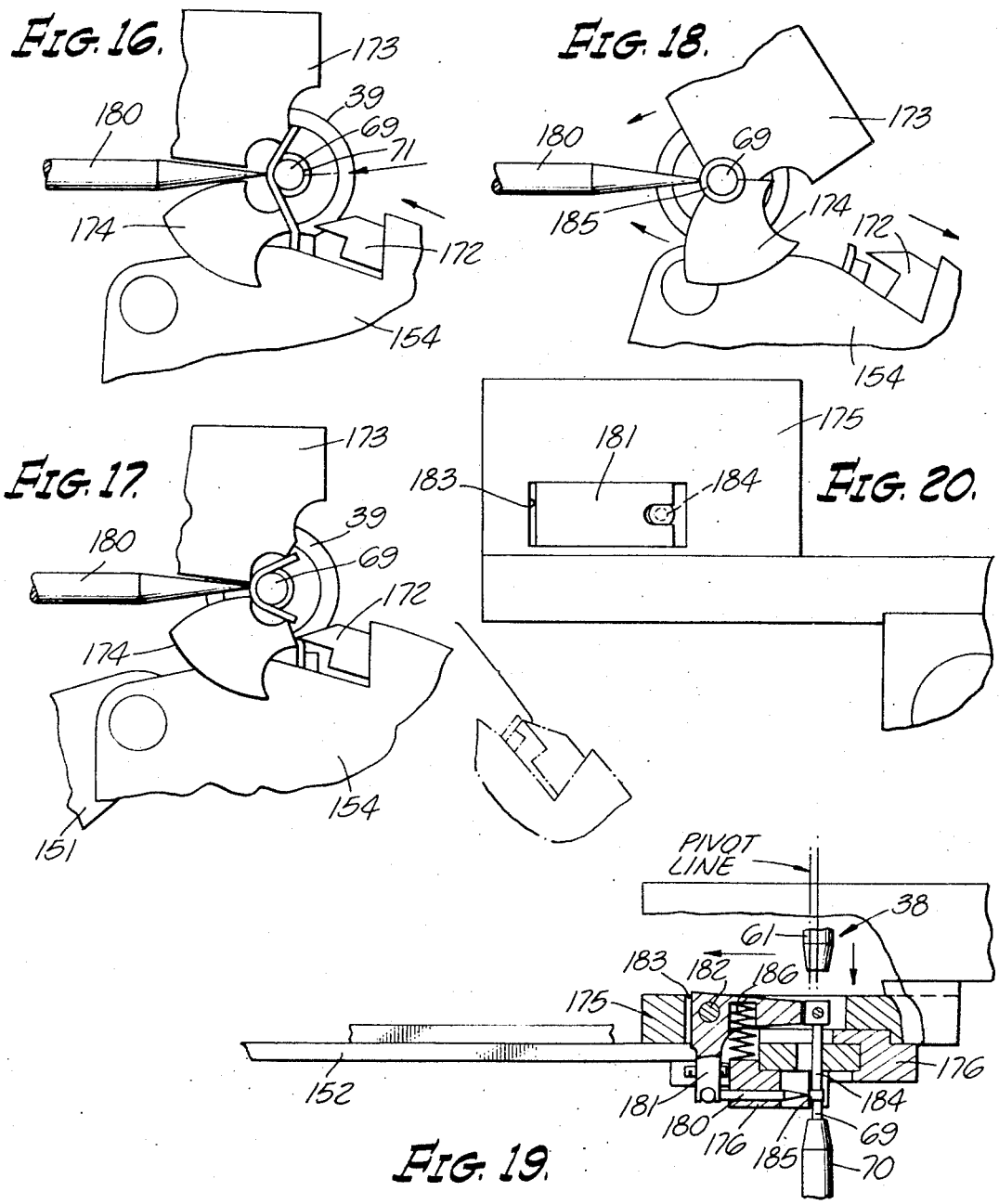

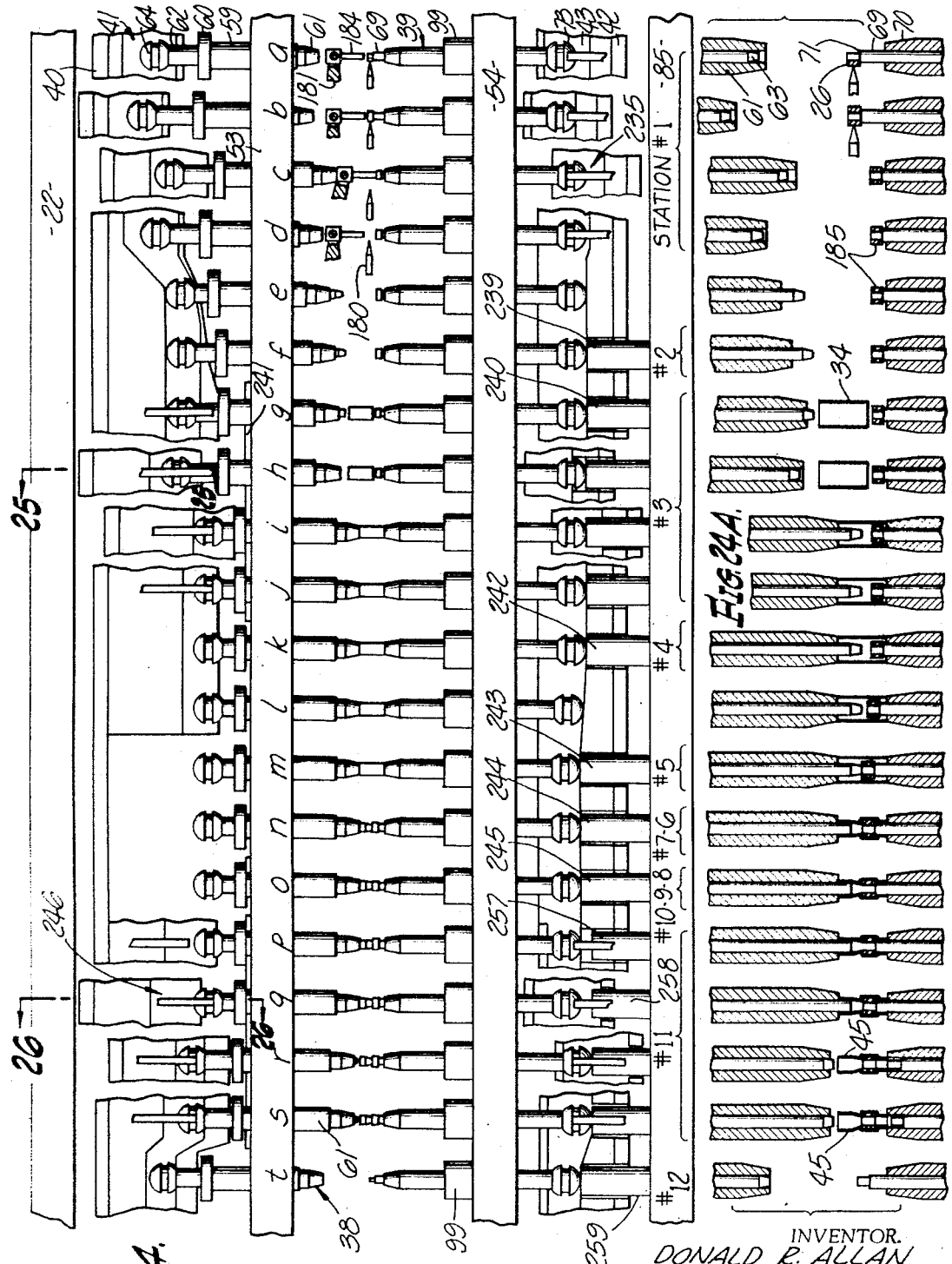

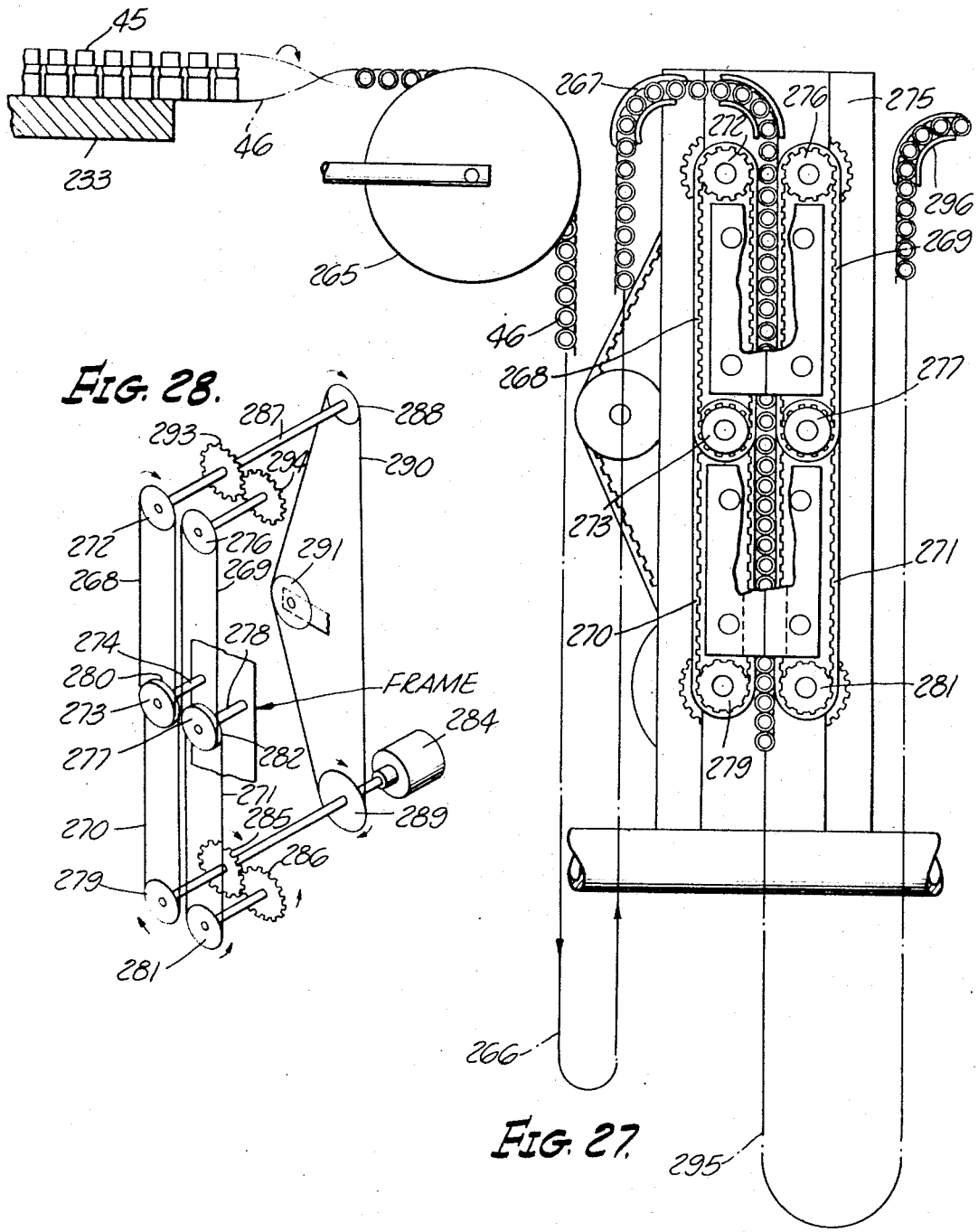

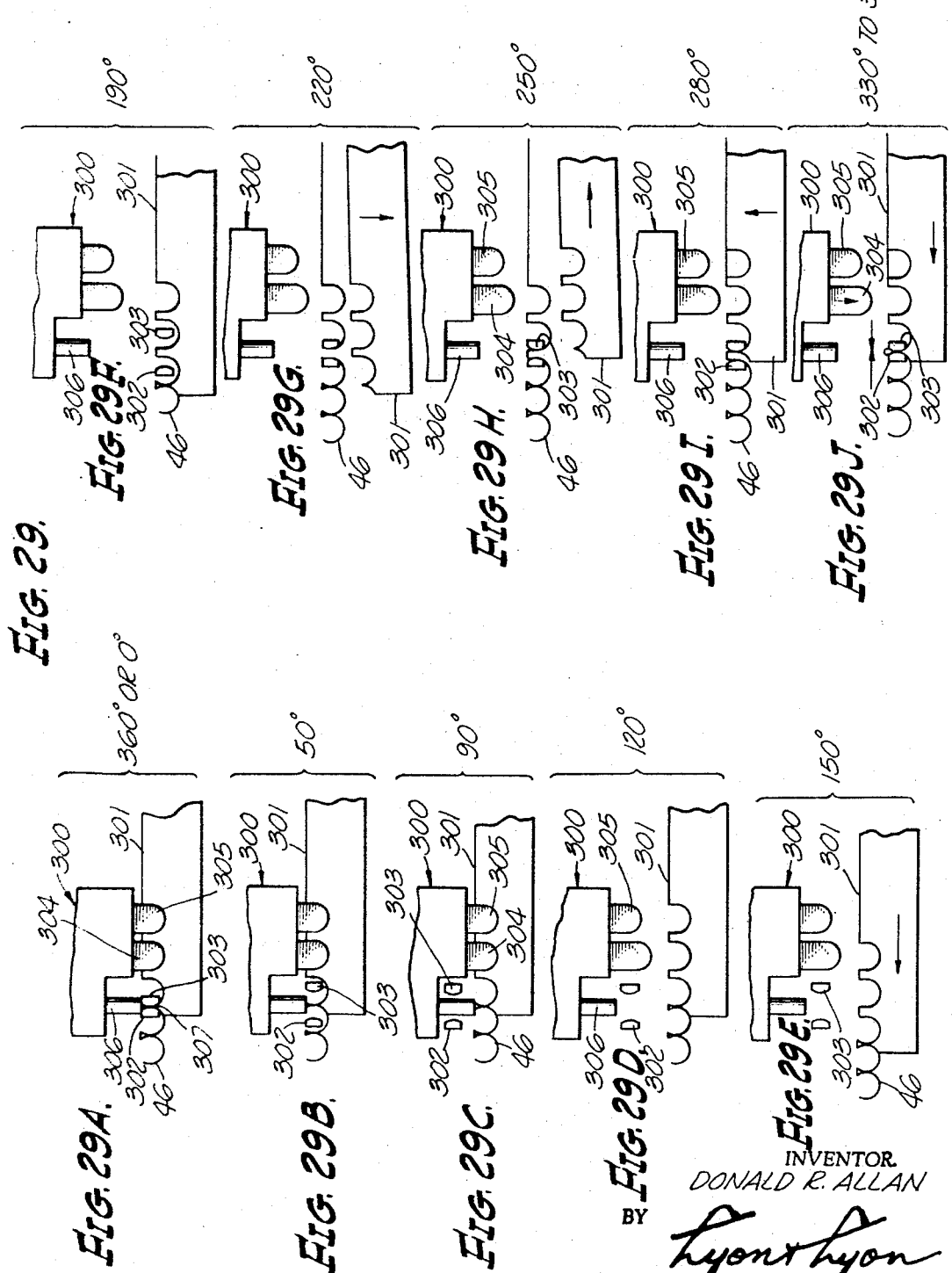

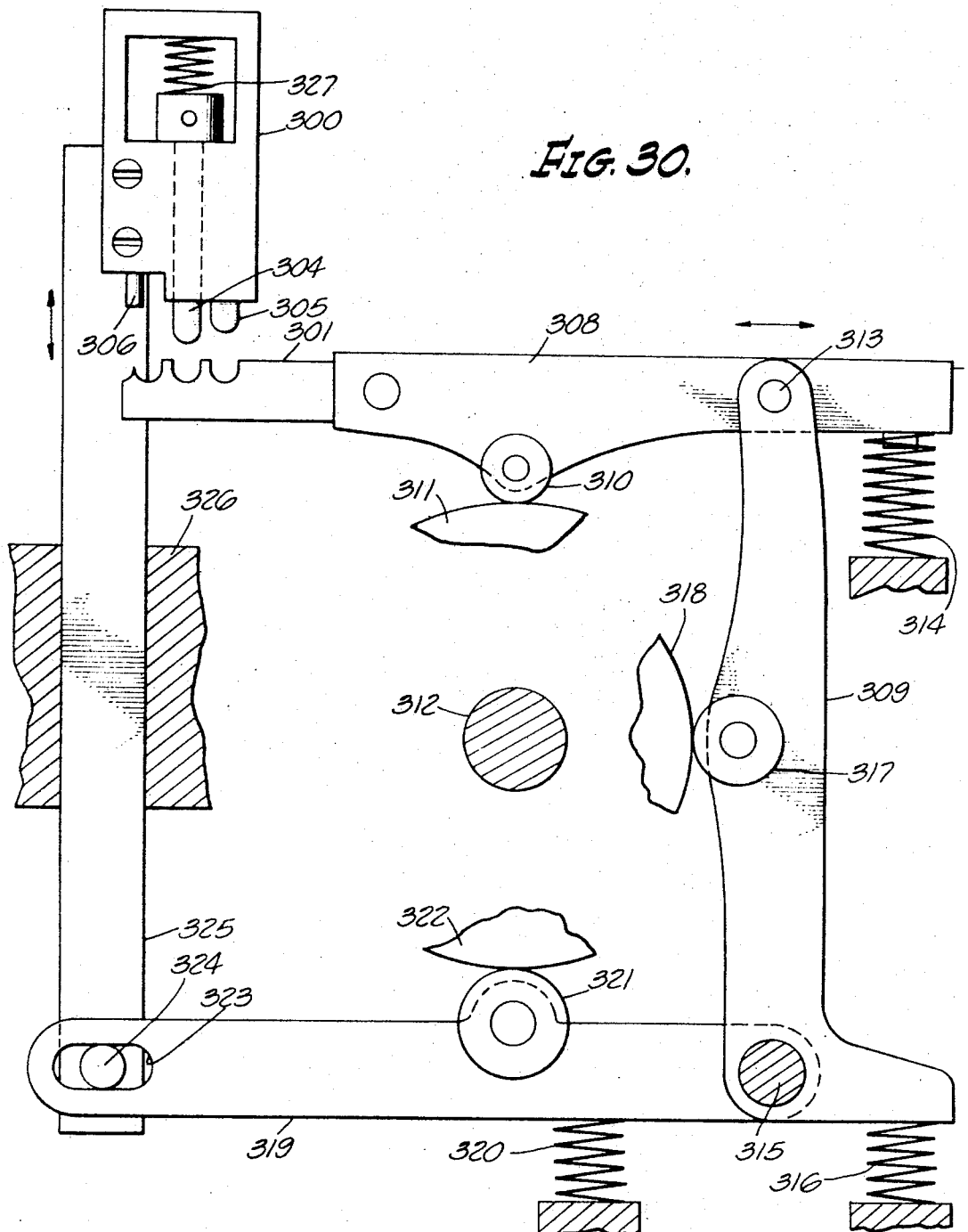

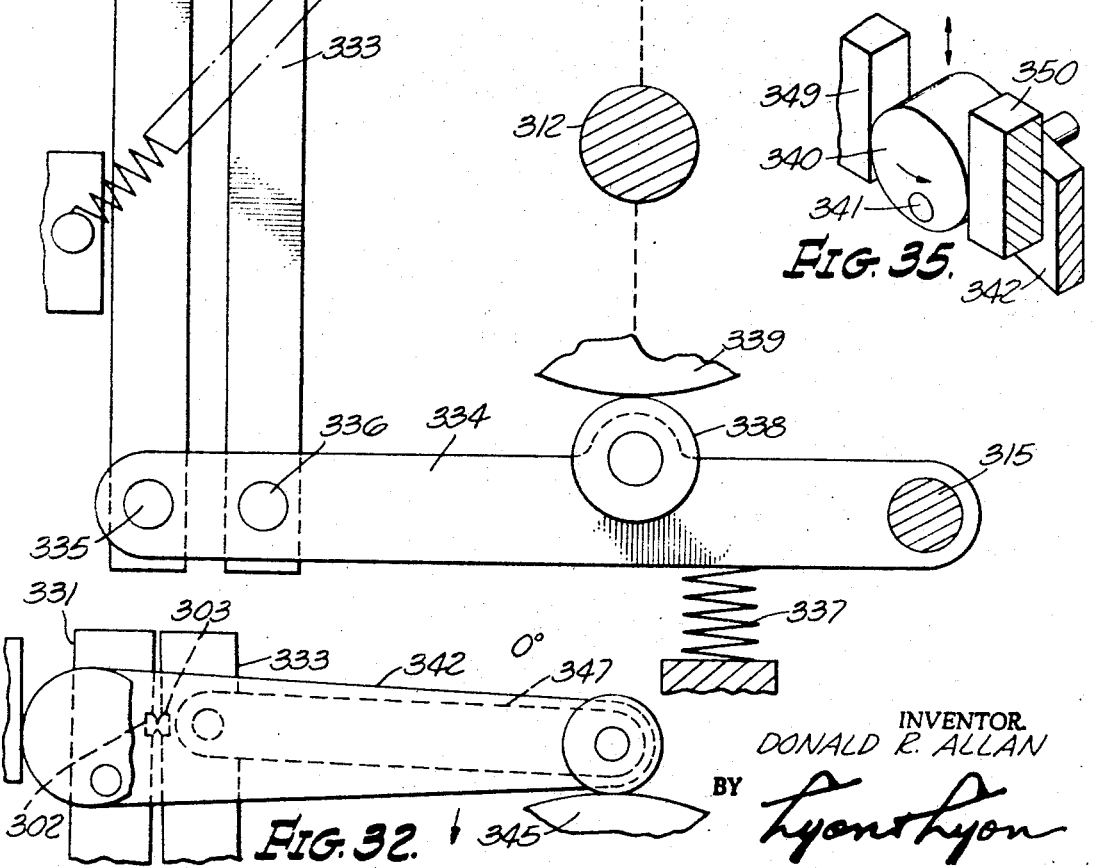

3,447,219
AUTOMATIC SOLDER SLEEVE FABRICATING MACHINE
Donald R. Allan, Menlo Park, Calif., assignor to Raychem Corporation, Menlo Park, Calif., a corporation of California
Filed Aug. 7, 1967, Ser. No. 658,715
Int. Cl. B23p 23/04, 25/00
U.S. Cl. 29—33                                              19 Claims

ABSTRACT OF THE DISCLOSURE

Apparatus for automatically fabricating and packaging solder sleeves from plastic sleeves and a roll of solder wire including a mechanism for feeding, flattening and perforating the solder wire, a mechanism for wrapping a metered portion of the perforated solder strip around one of a pair of cooperating mandrels to form a solder ring, a turntable for moving the mandrel pair to each of a plurality of additional stations where a heat-shrinkable plastic sleeve is positioned over the solder ring, the sleeve shrunk to its desired final shape, cooled and the completed solder sleeves inserted into a bandolier-like strip of packaging material. Apparatus is also provided for initially corrugating the strip of packaging material and for compressing the strip of packaging material around the sleeves carried thereby to insure a solid clamping action on the sleeves and proper spacing thereof.

Background of the invention

A solder sleeve is an electrical connector comprising a sleeve of heat recoverable material having a solder insert positioned therein. Such a sleeve is described in Wetmore Patent No. 3,243,211, the disclosure of which is incorporated by reference herein. The sleeving material and the solder insert are so related that when the sleeve is heated to above its heat recovery temperature to cause its recovery, the solder insert will flow. If two or more members to be connected are positioned within the sleeve prior to heating, the sleeve will shrink around the members and firmly grasp them while the solder insert will melt and form a solder connection between them. The overall result is an insulated, soldered connection in which the amount of solder and flux used is always the proper amount because the solder insert is preformed for this purpose.

Solder sleeves have met wide acceptance for various applications, particularly those in which a number of connections are preferably made simultaneously or those in which the members to be connected are difficult to reach or to work on with the conventional soldering tools. Solder sleeves are also widely used when a good soldered connection is critical or where it is desired to reduce the skill required of the person making the soldering operation.

Summary of the invention

According to the present invention, apparatus is provided for automatically fabricating and packaging solder sleeves thus decreasing their cost of manufacture. As is conventional, the apparatus uses as raw materials sleeves of plastic materials that have been expanded and provided with the property of elastic memory, for example, in the manner disclosed in Cook et al. Patent No. 3,086,242, the disclosure of which is incorporated by reference herein, and a conventional roll of round solder wire having a flux core. The apparatus converts the solder wire into a flattened, perforated strip of solder, the perforations permitting the flux core of the solder wire to flow prior to melting of the solder itself. The apparatus meters a proper amount of the perforated solder strip and wraps it around one of a pair of mandrels on a turntable which moves them through a plurality of stations where other operations are performed. At one of the stations, the apparatus feeds the plastic sleeves to a position above the solder ring on the mandrel and causes the mandrels to enter into the sleeve. A heating station is provided where the sleeve is shrunk down over the solder ring and the mandrels to its desired final shape. In order that the sleeves produced by the machine are conveniently packaged for shipment and later use, they are inserted into a corrugated strip of a suitable material which carries them away from the turntable. The strip is then compressed longitudinally to firmly hold the sleeves in place and properly space them. The resulting bandolier-like strip can then be wound in rolls containing the desired number of solder sleeves.

It is therefore an object of the present invention to provide apparatus for automatically fabricating solder sleeves.

Brief description of the drawings

FIGURE 4 is a side elevation, partly in section, of the solder sleeve fabricating apparatus of the present invention;
FIGURE 5 is a side elevation of a tie rod used in the present invention;
FIGURE 8 is a top plan view of a portion of the present apparatus showing the stations at which different operation occur;
FIGURE 9 is a schematic illustration of the solder feeding, flattening and perforating apparatus;
FIGURE 10 is a detail view showing the manner in which the solder strip is perforated;
FIGURE 11 is a top plan view showing a mechanism for wrapping a portion of a solder strip around a spindle;
FIGURE 12 is a top plan view of the mechanism of FIGURE 11 shown in a retracted position;
FIGURE 13 is a top plan view showing how the solder strip is fed to the spindle;
FIGURE 14 is a schematic illustration showing the solder driving mechanism of FIGURE 13;
FIGURE 15 is a top plan view showing the solder feeding mechanism after it has moved away from the spindle;
FIGURES 16, 17 and 18 show the positions of the various elements of the solder wrapping mechanism at different points in its operation;
FIGURES 19 and 20 are detail views showing a mechanism for holding the solder strip in place during the wrapping operation and then ejecting the solder ring and spindle from the wrapping station;
FIGURES 21 and 22 are sectional details showing the manner in which the plastic sleeves are fed to the apparatus shown in FIGURE 8;
FIGURE 23 is a perspective view of the mechanism for actuating the mechanism of FIGURE 22;
FIGURES 24 and 24A are schematic views showing the operations which take place at the various stations shown in FIGURE 8;

FIGURE 26 is an enlarged sectional detail of another latching mechanism of the present invention, taken along lines 26—26 of FIGURE 24;

FIGURE 27 is a side elevation, partly broken away and partly schematic, of apparatus for compressing a bandolier-like strip containing solder sleeves;

FIGURE 28 is a schematic illustration of the drive system for the apparatus of FIGURE 27;

FIGURES 29A–29J illustrate schematically the manner in which a strip of packaging material is corrugated to receive solder sleeves; and FIGURES 30–35 are schematic illustrations of the apparatus used to perform the operations of FIGURES 29A–29J.

Description of the invention

Figure 1:
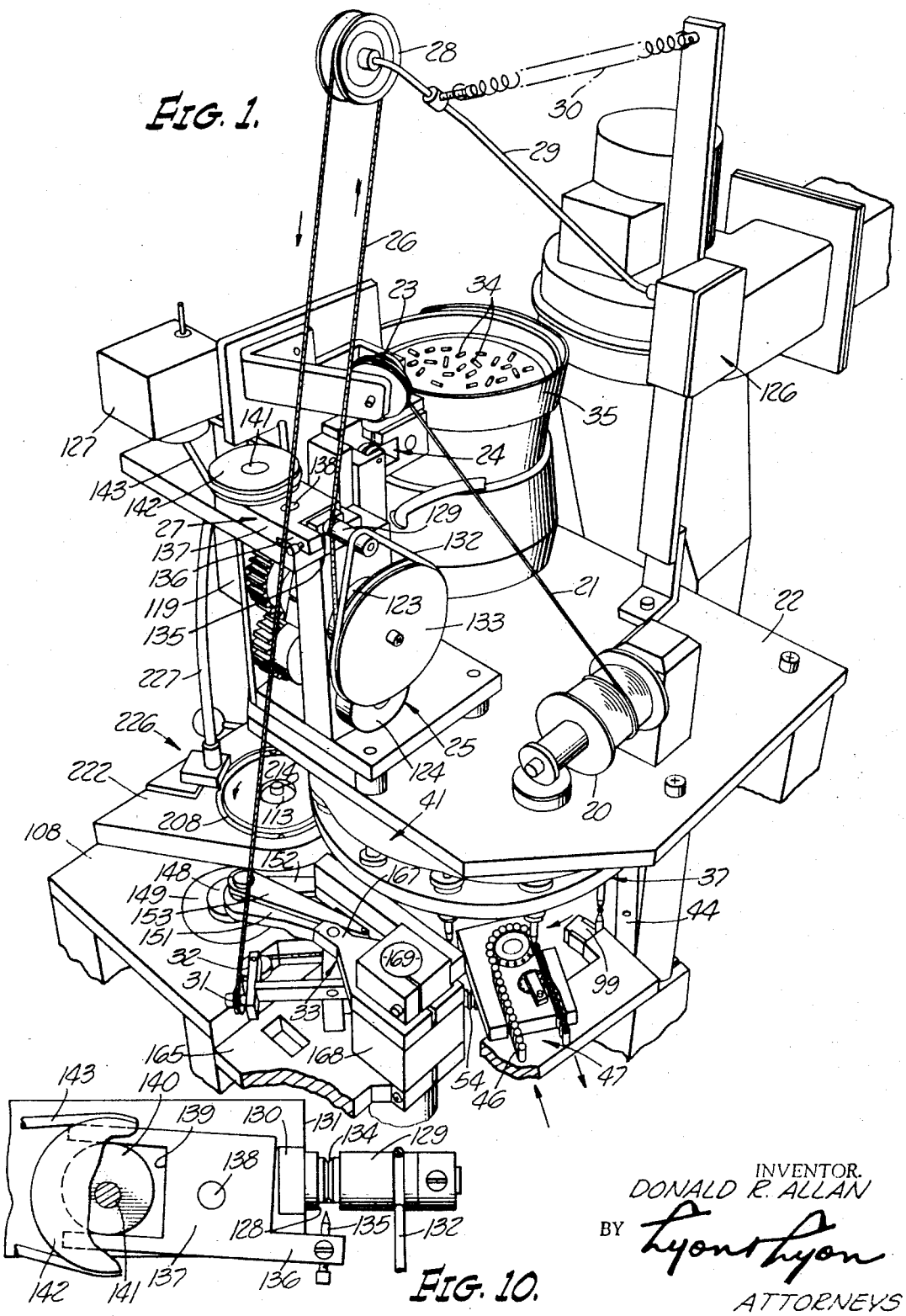
FIGURE 1 is a perspective view of the solder sleeve fabricating apparatus of the present invention.
Figure 2:
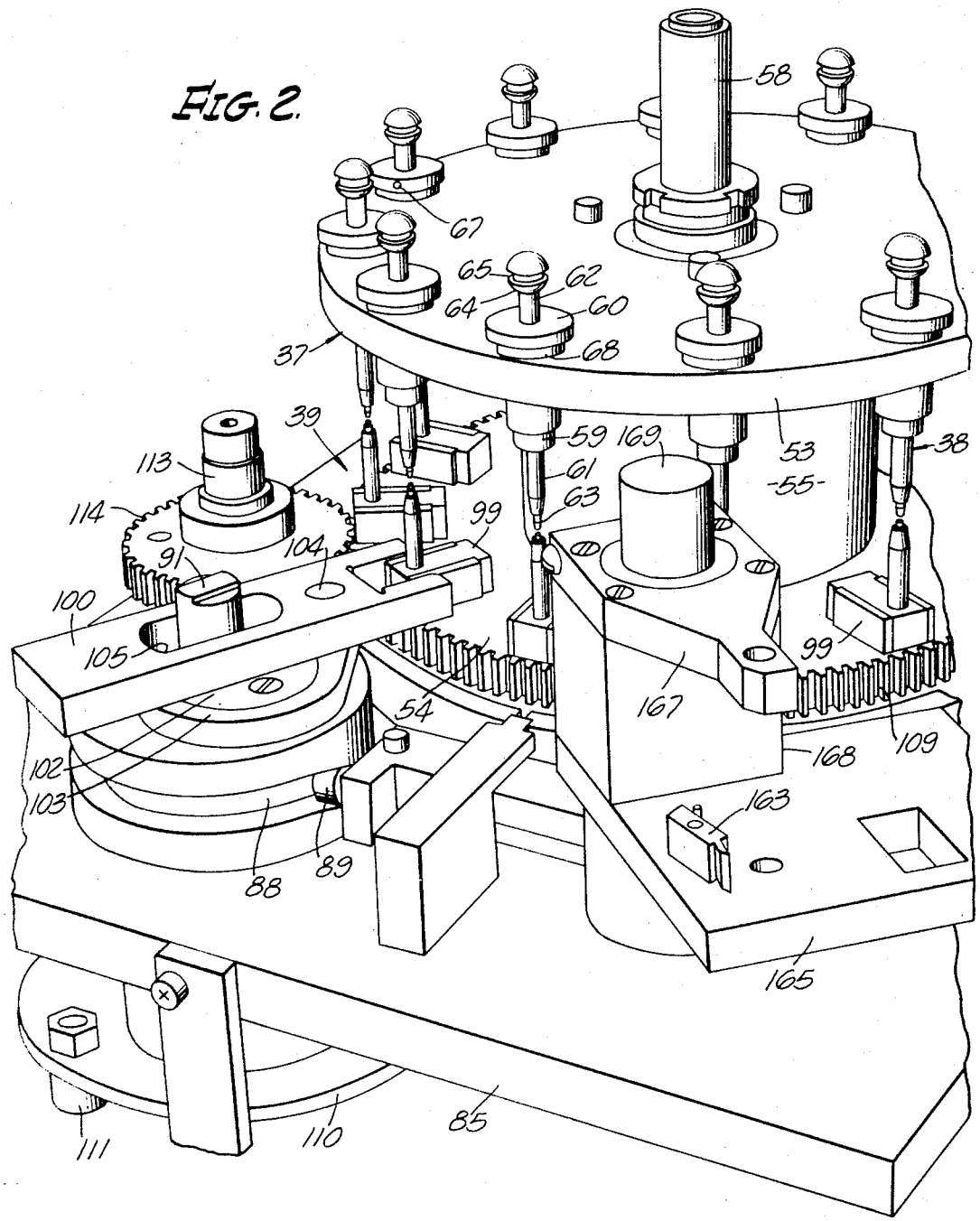
FIGURE 2 is a perspective view of the drive mechanism of the apparatus of the present invention.
Figure 3:
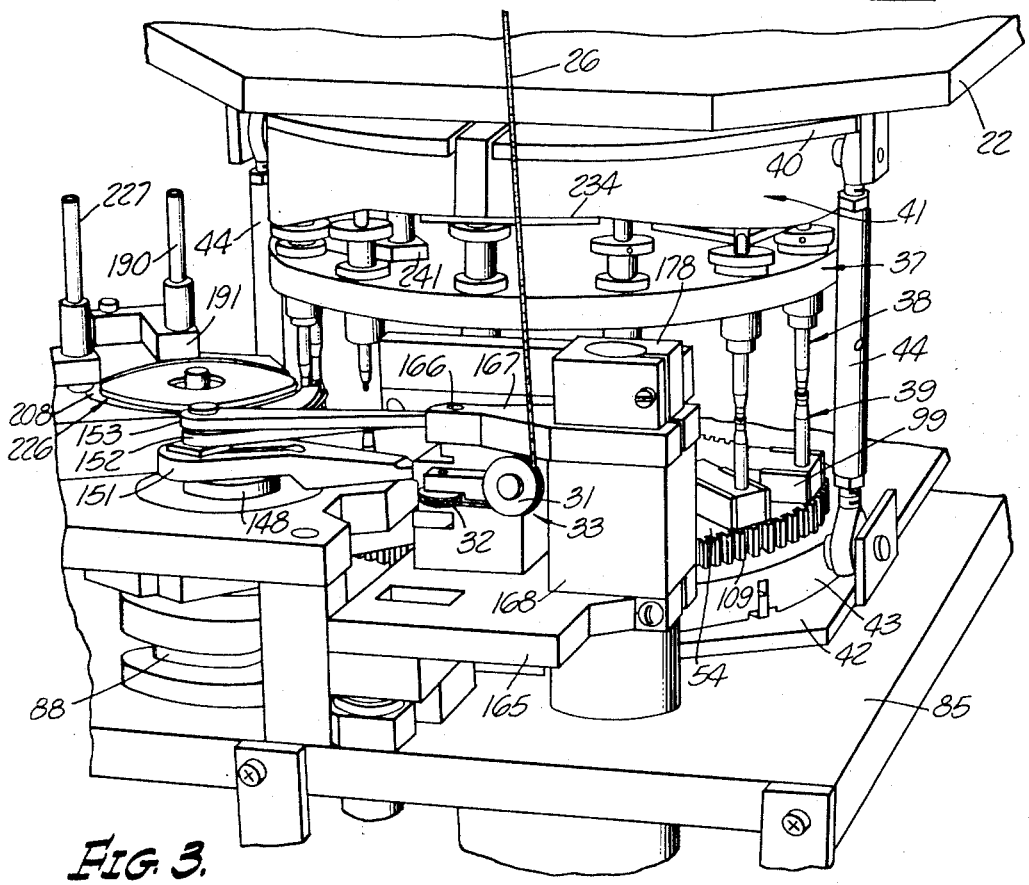
FIGURE 3 is a perspective view of the lower section of the apparatus of the present invention.

The general nature and construction of the solder sleeve fabricating apparatus of the present invention can be seen in FIGURES 1, 2 and 3. A roll 20 of round solder wire 21 is mounted on a plate 22 and the wire 21 is pulled over a guide pulley 23 and through a wire straightening unit 24 and then through a wire flattening section 25. The flattened solder strip 26 is then perforated by a perforating mechanism 27 and passed over a roller 28 mounted on an arm 29 supported by a spring 30. The flattened and perforated solder strip 26 is then passed over guide rollers 31 and 32 to a solder metering and wrapping mechanism 33.

The plastic tubular members or sleeves 34 are positioned in a vibrating hopper 35 and fed one at a time through a sleeve feeder tube to a rotating sleeve feeder mechanism 36. The solder metering and wrapping mechanism 33 and the sleeve feeder mechanism 36 cooperate with a rotating turntable 37 which carries a plurality of sets of upper mandrels 38 and cooperating lower mandrels 39. The operation of the upper mandrels 38 is controlled by a wobble plate 40 which has a cam track 41 mounted on its lower surface. The operation of the lower mandrels 39 is controlled by a wobble plate 42 which has a cam track 43 mounted on its upper surface and which is rigidly connected to wobble plate 40 by tie rods. The turntable is rotated to drive the mandrel sets from the solder metering and wrapping mechanism 33 to the feeder mechanism 36 and thence to the other stations where other operations such as heating and cooling are performed. The completed solder sleeves 45 are positioned in a corrugated packaging strip 46 which is driven through the turntable 37 by a drive mechanism 47 to remove the sleeves 45 from the turntable 37. The filled strip 46 is then passed to a strip compressing mechanism shown in FIGURES 27 and 28. To better illustrate other parts of the apparatus, FIGURE 3 shows the apparatus with the drive mechanism 47 removed while FIGURE 2 shows the apparatus with the upper structure and the solder metering and wrapping mechanism 36 removed.

The construction of the turntable 37 and the mandrels 38 and 39 and the manner in which they are driven and controlled are best shown in FIGURES 2, 3, 4, 5, 6 and 7. The turntable 37 comprises an upper plate 53 and a lower plate 54 joined by a cylindrical spacer 55 and is provided with bearings 56 and 57 to permit its rotation on a shaft 58. As can best be seen in FIGURE 6, each upper mandrel 38 comprises an outer sleeve 59 having a shoulder 60, a mandrel tip 61 fixedly attached to the sleeve 59, a plunger 62 to which is attached a spindle 63, and a knob 64 having a groove 65. The plunger 62 and spindle 63 can be extended from and retracted into the tip 61. The plunger 62 is provided with a notch 66 which cooperates with a pin 67 in the sleeve 60 to cause the sleeve 60 to be raised when the spindle 63 is fully retracted. The sleeve 59 is mounted in a bushing 68 in the plate 53 to permit vertical movement of the mandrel 38 relative to plate 53. The lower mandrel 39 comprises a spindle 69 fixedly mounted in a mandrel tip 70 and having a shoulder 71 formed thereon for receiving a portion of the solder strip 26. The spindle 70 is connected to a plunger 72 which is provided with a knob 73 having a groove 74 therein. The plunger 72 is slidably mounted in a bushing 75 passed through the lower plate 54. An elongated block 80 is mounted on the plate 22 and is provided with a channel 81 which receives the beaded end 82 of the wobble plate 40 which is provided with a central aperture 83 through which passes the shaft 58. An elongated block 84 is mounted on a lower support plate 85 and is similarly provided with a channel 86 which receives the beaded end 87 of the lower wobble plate 42. The cam track 41 mounted on wobble plate 40 serves to guide the movement of the knobs 64 of the upper mandrels 38 while the cam track 43 on lower wobble plate 42 guides the movement of the knobs 73 of the lower mandrels 39. The upper and lower cam wobble plates 40 and 42 are connected together by means of tie rods 44 such as that shown in FIGURE 5 so that the plates 40 and 42 move in unison.

The plates 40 and 42 are caused to reciprocate vertically by a cam 88 which cooperates with a roller 89 supported by a block 90 mounted on the plate 42. The cam 88 is mounted on a shaft 91 which is driven by a drive motor 92. As the shaft 91 rotates, the roller 89 will follow the track of the cam 88 with the result that the plate 42 and consequently the plate 40 will reciprocate vertically, carrying with them the cam tracks 41 and 43 and any of the mandrels 38 and 39 the knobs 64 and 73 of which are engaged by the cam tracks at that time. The plate 42 is also provided with a central aperture 93 which receives a block 94 in which the base of the shaft 58 is mounted.

Figure 7:
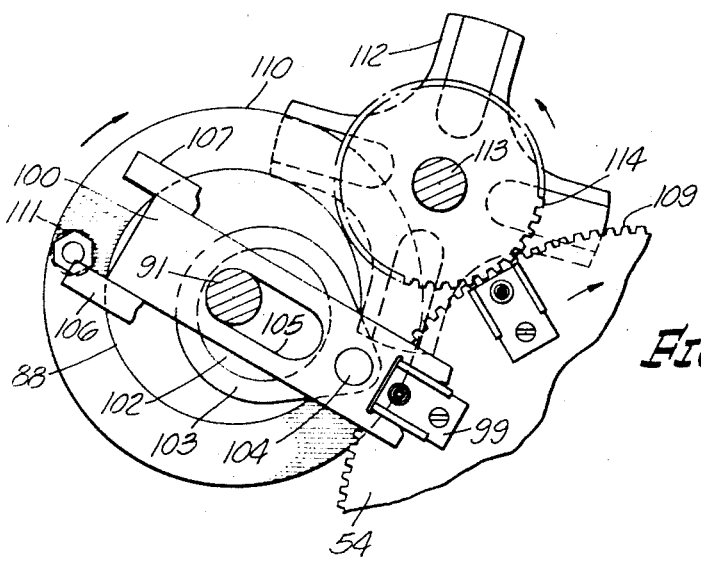
FIGURE 7 is a top plan view, partly in section, of a portion of the drive mechanism of the present invention.
Figure 6:
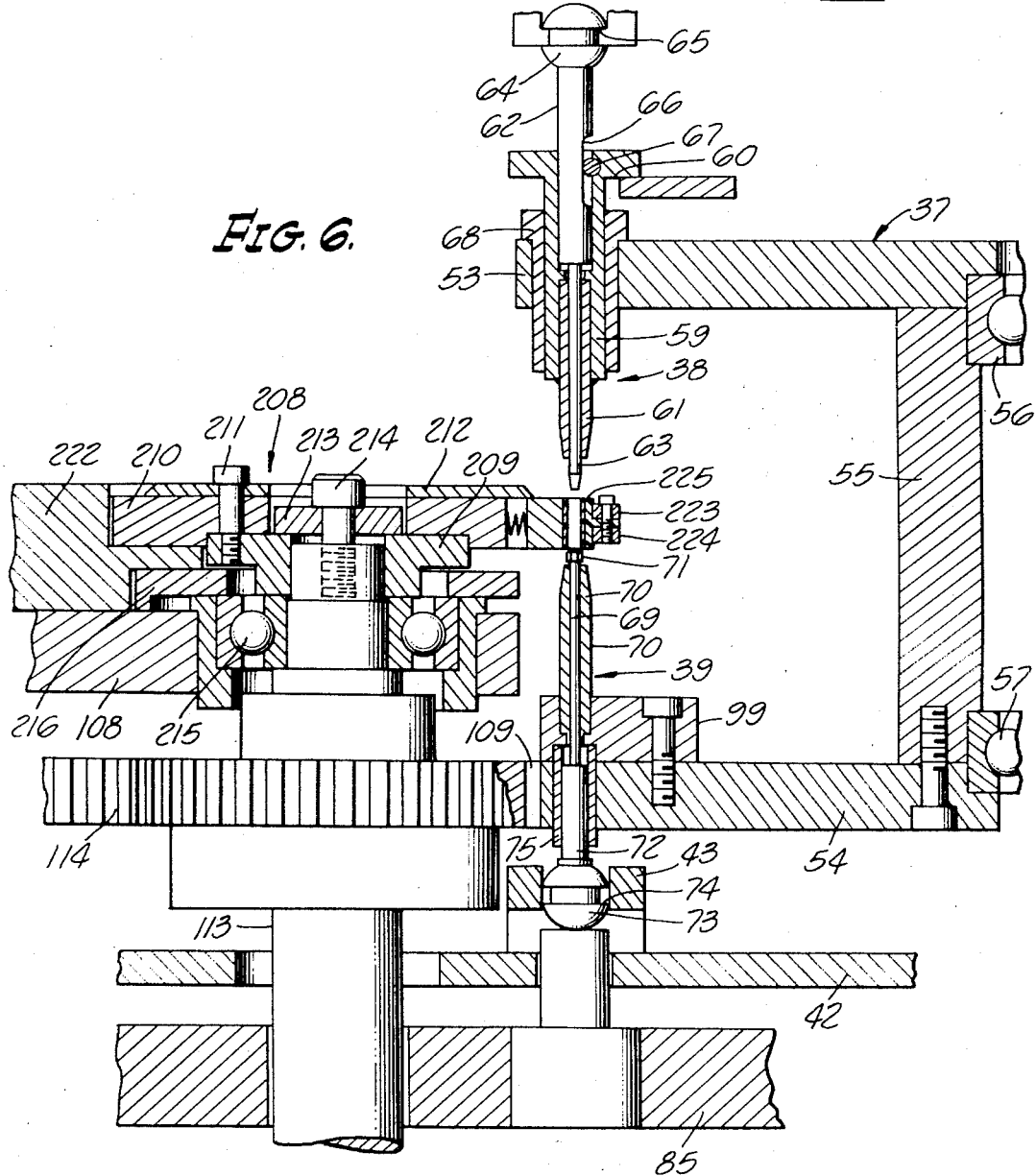
FIGURE 6 is a side elevation, partly in section, showing the position of various elements of the solder sleeve fabricating apparatus as a plastic sleeve is positioned above its associated solder insert.

As can best be seen in FIGURES 2, 6 and 7, each of the lower mandrels 39 is fixedly mounted in a rectangular block 99 which is mounted radially in the plate 54. These blocks 99 serve as part of a locking mechanism to prevent movement of the plate 54 and hence the turntable 37 during the interval an operation is being performed at each of the stations. The other element of the locking mechanism is a shot bolt 100 having a rectangular opening 101 at its forward end which is adapted to telescope over the block 99. The shot bolt 100 is reciprocated horizontally by a cam 102 which is eccentrically mounted on the drive shaft 91 and which cooperates with a cam follower 103 which is pinned to the shot bolt 100 by means of a pin 104. The shot bolt 100 is provided with a slot 105 through which the shaft 91 extends. As can be seen, as the shaft 91 rotates the cam 102, the shot bolt 100 will be caused to move into and out of telescoping engagement with one of the blocks 99. A pair of guides 106 and 107 are mounted on the undersurface of a plate 108 to constrain the movement of the shot bolt 100 to a linear manner.

The plate 54 is provided with peripheral gear teeth 109 and it, together with turntable 37, is rotated by means of a Geneva drive comprising disc 110 mounted on and driven by the drive shaft 91 and carrying a roller 111, a Geneva 112 mounted on a shaft 113 and rotated 90° by each revolution of the disc 110 and a gear 114, the teeth of which mesh with the teeth 109 of the plate 54. The diameter of the gear 114 is such that it causes the plate 54 to be moved 30° for each 90° movement of the Geneva 112. The plate 54 is provided with twelve of the blocks 99, each spaced 30° apart, so that for each revolution of the drive shaft 91, a different one of the blocks 99 is brought into position opposite the shot bolt 100. The cam 102 and cam follower 103 are arranged such that the shot bolt 100 is retracted while the plate 54 is moving. When the 90° rotation of the Geneva 112 and the 30° rotation of the plate 54 is completed, the cam 102 and cam follower 103 move the shot bolt 100 forward so that it telescopes over the block 99. This prevents the turntable 37 from moving while various operations are performed at the stations at which the blocks 99 with their associated mandrels 39 are positioned. The timing of the mechanism is such that the operations are completed before the shot bolt 100 is again retracted and the plate 54 caused to move.

The operations that occur at the various stations are illustrated schematically in FIGURE 8. At station No. 1, a metered amount of the solder strip 26 is wrapped around the spindle 69 of a lower mandrel 39 to form a solder ring. Station No. 2 is an idle station insofar as the mandrels are concerned although this is the location of the shot bolt latching operation. At station No. 3, one of the sleeves 34 is positioned over the solder ring and the upper spindle 63 moved into position within the sleeve. Station Nos. 4 and 5 are idle stations. At stations Nos. 6 and 7, hot air is blown on the sleeve to cause it to shrink down around the solder ring and assume a form as determined by the shape of the spindles. Of course, other forms of heating such as by infrared radiation could be substituted for the hot air. At station Nos. 8, 9 and 10, cool air is blown on the sleeve to reduce its temperature. At station No. 11, the completed solder sleeve is positioned in a pocket of the metal strip 46 which is suitably corrugated to receive the solder sleeves. Station No. 12 is also an idle station. It should be understood that the number of stations could be increased or decreased in accordance with the necessary operations to be performed and the gear ratios and other parameters of the associated equipment adjusted accordingly.

The manner in which the solder strip 26 is developed from the solder wire 21 and fed to the solder metering and wrapping mechanism 33 is shown schematically in FIGURE 9. A capstan 118 driven by a motor 119 pulls the wire 21 from the roll 20, over the guide roller 23, and through the wire straightening unit 24 which consists of a series of staggered rollers 120. The wire 21 is pulled around guide rollers 121 and 122 and then through the wire flattening section 25. The latter consists of a pair of flattening rollers 123, 124 which are driven by the motor 119 by the gear train 125. The now flattened solder is then perforated by the perforating mechanism 27 and passed over guide roller 28 mounted on arm 29 to the guide rollers 31 and 32 from whence it passes to the metering and wrapping mechanism 33. The arm 29 controls an electrical switch 126, which serves to de-energize the motor 119 and the perforating mechanism motor 127 when the solder strip 26 is being fed to the mechanism 33 faster than it can use it. When this occurs, slack develops in the strip 26, permitting the spring 30 to raise arm 29 and open switch 126, as shown. As the mechanism 33 uses up the solder strip 26, the arm 29 is pulled down, the switch 126 closed, and additional solder wire 21 pulled off roll 20.

The manner in which the solder strip is perforated can best be seen in FIGURES 1 and 10. The strip is passed through a groove 128 in a shaft 129 which is mounted for rotation in a block 130 mounted on a plate 131. The shaft 129 is driven by belt 132 and pulley 133 by the motor 119. The groove 128 in the shaft 129 is provided with a recess 134 which serves as a backup plate for a needle 135 which is mounted in an arm 136 of a block 137 which is pivotally mounted on the plate 131 by a shaft 138. The block 137 is provided with a cutout 139 in which is positioned an eccentric 140 mounted on a shaft 141 which is driven by a pulley 142 and belt 143 by the motor 127. As the pulley 142 rotates, it causes the eccentric 140 to move the block 137 back and forth around the shaft 138 with the result that the needle 135 is periodically driven through the solder strip 26.

The construction and operation of the solder strip metering and wrapping mechanism 33 is best shown in FIGURES 11 through 20. A disc 148 is mounted on the upper end of the shaft 91 which is journalled for rotation in the plate 108 by a bearing 149. A pin 150 is eccentrically mounted on the disc 148 and has pivotally mounted thereon first, second and third arms 151, 152 and 153 respectively. The arm 151 is pinned at its outer end to a block 154. The interior of the block 154 is hollow and has mounted therein two parallel shafts 155 and 156 on which are mounted discs 157 and 158 each having a plurality of radial needle points 159 mounted on their peripheries.

The shaft 155 has a gear 160 which is driven by a gear 161 mounted on the shaft 156. The shaft 156 also has a ratchet 162 mounted thereon which cooperates with a pair of spring-biased pawls 163 and 164. Pawl 163 is mounted on a plate 165. Pawl 164 is mounted on the block 154. The block 154 is pivotally mounted on a shaft 166 whose base is received in the plate 165 and whose upper end is received in a plate 167. The plates 165 and 167 are connected by a spacer 168 which is rotatably mounted on a shaft 169. A bracket 170 which supports the pulleys 31 and 32 is kept a fixed distance from the block 154 by a member 171. Construction of this part of the solder meter and wrapping mechanism in this manner permits it to be swung away from the turntable 37 so that the mechanism can be inspected, cleaned or the like. It also permits the solder feed mechanism to be removed for servicing. FIGURE 12 shows this apparatus in the retracted position while FIGURE 2 shows this apparatus with the plates 165 and 167 swung outwardly and the solder metering and feed mechanism 33 removed. FIGURES 1, 3 and 11 show the mechanism in the operative position.

The block 154 is provided with a knife 172 that serves to sever a metered portion of the strip 26 from the remainder thereof.

The arm 152 is pivotally connected to a first of a pair of bending dies 173 and 174. The bending die 174 is pivotally connected to the arm 153. The bending dies 173 and 174 are positioned on the undersurface of a plate 175 and are held in place by a retainer plate 176. The plate 175 is supported by a bar 177 mounted on a block 178 which is bolted to the top of the shaft 169.

The retainer plate 176 slidably receives a needle 180. The needle 180 is connected to one end of a bell crank 181 which is pivoted about a pin 182 which extends across an opening 183 in the plate 175. The other end of the bell crank 181 is connected to a plunger 184 which is positioned below the position assumed by one of the upper mandrels 38 when the mandrel is at station No. 1.

The operation of the solder feeding and wrapping mechanism 33 is as follows, particular reference being made to FIGURES 16–20. As one of the lower mandrels 39 approaches station No. 1 with its spindle 69 extended, a portion of the solder strip 26 has already been positioned in the path of the spindle 69. As the turntable 37 approaches its set position in station No. 1, the portion of the spindle 69 above the shoulder 71 engages the extending portion of solder strip 26 and causes it to bend somewhat around the spindle 69 because of the presence of the bending dies 173 and 174. At this time, because of the rotation of the shaft 91 and disc 148, the pin 150 is retreating away from the turntable 37. As a result, the block 154 is moving in a counterclockwise direction around the shaft 166, moving the knife 172 toward the solder strip 26. This is shown in FIGURE 16.

As the turntable 37 continues to rotate, the spindle 69 carries the extending portion of the strip 26 into engagement with needle 180 so that the needle 180 holds the strip against spindle 69. This further movement of spindle 69 has also caused the die 173 and 174 to wrap the strip even further around spindle 69. Movement of the turntable 37 now temporarily ceases.

Rotation of the disc 148 has continued causing the knife 172 of the block 154 to sever the extended portion of the solder strip 26 from the remainder of the strip and the block 154 then begins to move away from the die 174 because the pin 150 is now moving forward toward turntable 37. This position of the elements is shown in FIGURE 17.

As the pin 150 moves forward, the arms 152 and 153 cause the bending dies 173 and 174 to close around the spindle 69 and the solder strip portion positioned thereon. When the pin 150 reaches its forwardmost position, the jaws of the dies 173 and 174 are completely closed and the solder strip is bent into a ring 185 around the spindle 69. This position is shown in FIGURE 18. The upper mandrel 38 now begins to descend on the plunger 184. When the mandrel tip 61 of the mandrel 38 engages the plunger 184, it causes the bell crank 181 to move the needle 180 against the force of spring 186 and out of engagement with the solder ring 185. This is shown in FIGURE 19. As the mandrel tip 61 continues to depress the plunger 184, the bottom of the plunger 184 engages the solder ring 185 and the spindle 69 and causes them to be depressed below the level of the dies 173 and 174 permitting the mandrels 38 and 39 to move onto station No. 2.

As the result of the block 154 being moved in the clockwise direction away from the die 174, the pawl 164 prevents the ratchet 162 and hence the needle point discs 157 and 158 from rotating and feeding more of the solder strip. However, as the counterclockwise rotation of the block 154 begins, the pawl 163 causes the ratchet 162 to rotate with the result that a predetermined amount of solder is advanced by the needle point discs 157 and 158. The mechanism is then ready for the arrival of the next spindle 69.

FIGURES 6, 8, 21, 22 and 23 show the manner in which a plastic sleeve 34 is presented to the turntable 37. A main sleeve supply tube 190 connects the vibrating hopper 35 with the primary feeder 191. Once the sleeves 34 are inserted into the tube 190, they are gravity-fed into a chamber 192 within the primary feeder 191. A plunger 193 is mounted within the feeder 191 and is biased away from the chamber 192 by a spring 194. The end of the plunger 193 is pinned to a bell crank 195 which is pivotally mounted around a pin 196. A finger 198 on a lever 199 is adapted to engage the outer end of the bell crank 195 to cause it to rotate in a clockwise direction with the result that the plunger 193 will engage the sleeve 34 positioned within the chamber 192 and push it out of the chamber. The lever 199 is mounted on a shaft 200 which also has mounted thereon an arm 201 which carries a cam follower 202. The cam follower 202 follows the contours of a cam plate 203 mounted on the drive shaft 91. In this manner, the ejection of a sleeve 34 from the feed 191 is synchronized with the movement of the turntable 37. A locking rod 204 is provided for maintaining the feeder 191 in position and permitting its easy removal for servicing or the like.

The primary feeder 191 is positioned adjacent a rotating member 208 which serves to carry the sleeves 34 from the main feeder 191 to between the mandrels 38 and 39 on the turntable 37. The rotating member 208 is mounted on the shaft 113 which also carries the Geneva 112 and the gear 114. The rotating member 208 comprises a hub 209, a disc 210 attached to the hub 209 by bolts 211 and a cover plate 212. This assembly is connected to the shaft 113 by means of a hold down plate 213 and a bolt 214. This assembly is rotatably mounted in the plate 108 which is provided with a bearing 215 for this purposes. The bearing 215 is held in place by a bearing retainer 216.

The disc 210 is provided with four cutout portions 217 (FIGURE 21) in each of which is pivotally mounted a dog 218 which is urged out of the cutout 217 by a spring 219. The dogs 218 are each provided with a notch 220 suitable for receiving a sleeve 34. The cover plate 212 is also provided with a series of notches 221 which overlie each of the notches 220 in the dogs 218. It is into these notches that the primary feeder 191 delivers the sleeves 34. A guide plate 222 is mounted on the plate 108 and serves to depress the dogs 218 against the forces of the springs 219 until the dog reaches the position where it is to deliver a sleeve 34 to the turntable 37. The plate 222 also serves as a base plate against which the sleeves 34 can rest as they are rotated from the feeder 191 to the turntable 37. The plate 222 is cut away in part of the area where it overlaps with the turntable 37 so that the mandrels 38 and 39 can be brought into engagement with the sleeve 34. The end of the plate 222 that extends into the turntable 37 is provided with a pair of extending fingers 223 and 224 which are bolted to a plastic guide 225 against which the dogs 218 urge a sleeve 34 when it is free from the constraint of the guide plate 222.

As shown in FIGURE 8, the feeder mechanism has four stations. The primary feeder 191 is positioned at the first station. At the second station there is positioned an auxiliary feeder 226. The auxiliary feeder 226 is connected to a feed tube 227 which is kept full of sleeves 34 by the operator. The auxiliary feeder 226 comprises a simple plunger which is controlled by an electrical solenoid. The solenoid receives its impulse from a trip switch which indicates that a part has not been inserted into the notch 221 in the rotating member 208 by the primary feeder 191. The details of this auxiliary feeder 226 are not illustrated as it is believed that they are obvious. The third station of the feeder mechanism is an idle station while the fourth is the station at which the sleeves 34 are fed to the turntable 37.

The rotating member 208 is indexed through a 90° angle each time the Geneva 112 is engaged. The notches 221 are kept filled with sleeves 34 by the primary feeder 191 and as the rotating member 208 is indexed the sleeve in the notch keeps the auxiliary feeder 226 from operating. The notch is then rotated a second 90° to the idle station. When the third 90° indexing starts the plastic sleeve 34 is situated in the notch 221 resting on the plate 222 but approximately 20° before it stops indexing the plate 222 is discontinued and the spring-loaded dog 218 extends outward to clamp the sleeve 34 against the plastic guide 225. The spring-loaded dog 218 serves the function of supporting the sleeve 34 by radially applied pressure during the passage of the plastic sleeve 34 in the area where the plate 222 has been cut away to allow the bottom mandrel 39 to move into place directly below the sleeve 34.

As can best be seen in FIGURE 8, the drive mechanism 47 for the packaging strip 46 comprises a gear train 228 which has a gear 229 which meshes with and is driven by the plate 54, a feeder wheel 230 which drives the strip 46, and a tension gear 231 which acts to maintain a slight tension in the strip 46 to keep the loaded strip from jamming in the guide slot 232 formed in the plate 233. When the turntable 37 indexes the mandrels 38 and 39 into place the strip 46 which is suitably preformed in a manner to be discussed hereinafter, then grips the solder sleeve 45 so that the spindles 63 and 69 can be retracted from it.

Figure 25:
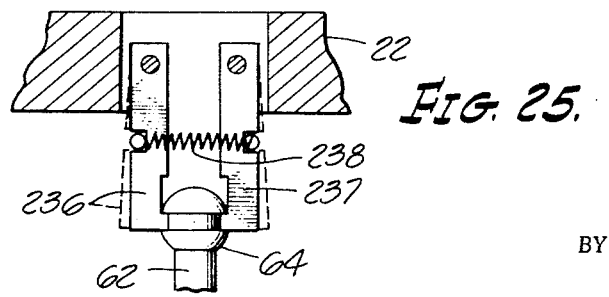
FIGURE 25 is an enlarged sectional detail of a latch mechanism of the present invention, taken along lines 25—25 of FIGURE 24.

Turning now primarily to FIGURES 24 and 24A, with reference also being made to FIGURES 25 and 26, the operations that are performed at the various stations are shown. It should be noted that the entirety of the cam tracks 41 and 43 are not shown but rather only the portions of these tracks at the various stations. It should also be noted that the cam tracks 41 and 43 are not continuous as at some of the stations no upper cam track is needed and at some of the stations no lower cam track is desired. It should also be noted that in FIGURE 24, each pictorial representation of a set of cooperating mandrels does not necessarily represent a single station, but rather a group of such representations may illustrate the sequence of operations at one station, or a single pictorial representation may represent the operation at a plurality of stations. FIGURE 24 illustrates the entire mechanism involved while FIGURE 24A is an enlarged illustration of the position of the mandrel tips during the different operations. It should be remembered when considering these figures that the wobble plates 40 and 42 are being intermittently vertically reciprocated to cause the movements of the mandrels and mandrel components at the various stations. It should also be noted that the various bushings are not shown in these figures.

Proceeding from the right hand side of FIGURES 24 and 24A, positions, *a, b, c,* and *d* show the sequence of operations that occur at station No. 1. In position, *a*, the cam track 41 has caused the knob 64 of the upper mandrel 38 to be pulled as far as possible out of the sleeve 59 so that the sleeve 59 has slid upwardly in the plate 53 to a position which permits it to clear the plunger 184. The cam track 43 has caused the knob 73 of the lower mandrel 39 to be moved upwardly so that the spindle 69 of the mandrel 39 is positioned to receive the extended end of the solder strip 26 in the manner already described. At position *d*, the upward movement of the plate 40 and cam track 41 has moved the knob 64 and consequently the sleeve 59 to its upwardmost position. The concurrent upward movement of the plate 42 does not effect the lower mandrel 39 because it is already in its uppermost position. During this time, the bending dies 173 and 174 wrap the solder strip around the spindle 69 in the manner already described. At position *c*, the upper plate 40 has again moved downward with the result that plate 234 (FIGURE 3) mounted on the undersurface of the cam track 41 engages the shoulder 60 of the sleeve 59 and forces the sleeve 59 downwardly with the result that the mandrel tip 61 engages the plunger 184, forcing it downwardly which causes the needle 180 to be removed from the solder ring 185 and further positively causes the lower mandrel 39 to be moved downwardly in the manner already described.

When the lower mandrel is moved downwardly at position *c*, the knob 73 is grasped by a latch mechanism 235 similar to that shown in FIGURE 25 although inverted in position from that of FIGURE 25. The latch mechanism shown in FIGURE 25 comprises a pair of hook dogs 236 and 237 that are pivotally mounted to the plate 22 and urged towards each other by a spring 238. When a mandrel knob is pressed against the ends of the hook dogs 236 and 237, the rounded surface of the knob forces the dogs apart against the force of the spring 238 until the ends of the dogs enter into the groove in the knob. The knob is then held against vertical movement until further rotation of the turntable 37 causes the knob to ride out of from between the dogs 236 and 237. The latch mechanism 235 is identical to that shown in FIGURE 25 except that the dogs are connected to the plate 85 rather than the plate 22.

At position *d*, the upward movement of the plate 40 has caused the knob 64 and consequently the sleeve 59 to again be moved upwardly to disengage the mandrel tip 61 from the plunger 184. The lower mandrel 39 is maintained in position by the latch mechanism 235.

In position *e*, the mandrels are passing from station No. 1 to station No. 2. The ball 64 of the upper mandrel 38 has been forced downwardly by the cam track 41. At this point, the sleeve 59 is floating and typically assumes the position shown. The knob 73 of the mandrel 39 has ridden up the cam track 43 and out of the latch mechanism 235.

Position *f* shows the position of the mandrels at station No. 4. The knob 73 of the lower mandrel is now performed. To prevent the lower mandrel 39 from moving with the movement of the plate 42 and cam track 43, the cam track 43 is interrupted and the knob 73 of the mandrel 39 rests on a block 239 which passes through the plate 42 and is mounted on the stationary plate 85.

At position *g*, the mandrels have reached station No. 3.

The mandrels are now positioned on either side of the sleeve 34. The knob 64 of the upper mandrel 38 has passed between the hook dogs of the latch mechanism shown in FIGURE 25. However, because the knob 64 passes between the dogs 236 and 237 in a manner such that the groove 65 in the knob 64 is above their hook ends, they do not engage. The knob 73 of the lower mandrel 39 is again resting on a block 240 similar to the block 239. At position *h*, the plates 40 and 42 have reciprocated upwardly. Since the ball 73 is resting on the block 240, it does not move. The ball 64 is, however, moved upwardly by the cam track 41 with the result that the sleeve 59 is retracted somewhat through action of the pin 67.

At position *i*, the downward movement of the plate 40 causes the knob 64 to move downwardly so that the mandrel tip 61 engages the sleeve 34 and forces it down over the solder ring 185 positioned on the shoulder 71 of the spindle 69 of the mandrel 39. The downward movement of the knob 64 causes the groove 65 therein to be engaged by the dogs 236 and 237 of the latching mechanism so that the knob 64 and spindle 63 are restrained against further vertical movement. The downward movement of the plate 42 has not affected the position of the mandrel 39 as it is resting on the block 240. A plate 241 (FIGURES 3, 4) is provided below the shoulder 60 of the sleeve 59 to prevent it from descending too far and engaging the sleeve 34.

At position *j*, the plate 40 has moved to its intermediate position. The position of the knob 64 relative to the plate 53 has not moved, however, because of the operation of the latching mechanism.

Position *k* shows the position of the mandrels at station No. 4. The knob 73 of the lower mandrel is now resting on a block 242 while the knob 64 of the mandrel 38 has been freed from the grasp of the latching mechanism. As the mandrels move towards station No. 5, they pass through position 1 at which time the knob 73 of the lower mandrel 39 rides up the cam track 43 with the result that the spindle 69 of the mandrel 39 begins to move toward the spindle 63 of the mandrel 38. The mandrels then reach position *m* which shows their position at station No. 5. As can be seen, the knob 73 of the lower mandrel 39 is resting on a block 243 while the upper cam track 41 has become discontinuous. Therefore, reciprocation of the plates 40 and 42 do not affect the mandrels 38 and 39.

Position *n* shows the position of the mandrels at stations Nos. 6 and 7 where the sleeve 34 is heat recovered around the spindles 63 and 69 and the solder ring 185. The heating cycle is sufficient to recover the sleeve 34 but not sufficient to melt the solder ring 185 or cause the flux therein to flow. The knob 64 of the mandrel 38 is still free of the cam track 41 and the knob 73 of the mandrel 39 sequentially rests on a pair of blocks, only one of which 244 is shown.

Position *o* shows the mandrels when they reach the cooling stations Nos. 8, 9 and 10. The knob 73 is resting on a block 245 and the knob 64 is still free of the cam track 41.

The mandrels are then moved to station No. 11 where the operations shown in position *p, q, r* and *s* are performed. At position *p*, the knob 64 re-enters the cam track 41 and is positioned beneath a latching mechanism 246. This latching mechanism 246 is shown in FIGURE 26 and consists of a plunger 247 which passes through the plate 22 and the plate 40 and has a pair of hook dogs 248 and 249 pivotally mounted on its lower end and urged towards each other by a spring 250. The plunger 247 is connected to a bar 251 which is pivoted around a pin 252 mounted on the plate 22 and connected at its other end to a rod 253. The rod 253 passes through the plate 40 and is provided with a pair of collars 254 and 255. The rod 251 is biased in the counterclockwise direction by a spring 256 seated in the plate 22. When the plate 40 moves up and hits the collar 254, the plunger 247 is moved down to permit the dogs 248 and 249 to engage in the groove of a knob positioned under the mechanism 246. When the plate 40 goes down, it strikes the collar 255 causing the plunger 247 to be moved to its highest position, moving the knob 64 along with it. At position *p*, the knob 73 of the lower mandrel 39 is overlying a latch mechanism 257 which is similar to the latch mechanism 235.

At position q, the plate 40 has been moved upwardly with the result that the plunger 247 goes down and the dogs 248 and 249 grasp the knob 64. The knob 73 is positioned above a block 258 which protrudes through the cam track 43 and thus is not moved by upward movement of the plate 42. In position r, the plate 40 has moved downwardly with the result that the plunger 247 and the knob 64 of the mandrel 38 moves upwardly resulting in the withdrawal of the spindle 63 from within the completed solder sleeve 45 and the movement of the mandrel tip 61 away from the solder sleeve 45 as a result of the action of the pin 67. The downward movement of the plate 42 has caused the track 43 to engage the knob 73 of the lower mandrel 39 and move it downwardly with the result that the spindle 69 is withdrawn from within the solder sleeve 45. The knob 73 is locked in the lower position by the latch mechanism 257. Position s shows the solder sleeve 45 completely free of the mandrels 38 and 39 and ready to be removed from the turntable 37 by the mechanism 47. Position t shows the position of the mandrels 38 and 39 at station No. 12. As can be seen, the knob 73 of the lower mandrel 39 has ridden up the track 43 with the result that the spindle 69 is again extended. The knob 73 has ridden free of the latch mechanism 257 and now rests on a block 259 similar to the block 239, etc. The knob 64 of the upper mandrel 38 has ridden up the track 41 with the result that the spindle 63 is retracted and the sleeve 59 carried high enough cause the mandrel tip 61 to clear the plunger 184 as the turntable 37 again moves the mandrels to station No. 1.

FIGURES 27 and 28 show the apparatus for compressing the packaging strip 46 of metal or the like around the completed solder sleeves 45 which it carries away from the station No. 11 shown in FIGURE 8. The filled strip 46 is passed over a pulley 265 and then allowed to form a slack loop 266. The strip then enters a guide 267 which guides it between a first pair of belts 268 and 269 and a second pair of belts 270 and 271. The belt 268 is driven by a drive sprocket 272 and passes over an idler sprocket 273 which is the first of two idler sprockets rotatably mounted on a shaft 274 supported by a framework 275 which also supports the various other shafts described. The belt 269 is driven by a drive sprocket 276 and passes over an idler sprocket 277 which is one of two such idler sprockets rotatably mounted on a shaft 278. The belt 270 is driven by a drive sprocket 279 and passes over the second idler gear 280 rotatably mounted on shaft 274. The belt 271 is driven by a drive sprocket 281 and passes over the second idler gear 282 mounted on the shaft 278.

The drive sprocket 279 is mounted on a shaft 283 driven by a motor 284. The drive sprocket 281 is driven at the same speed as the drive sprocket 279 through the intermediary of gears 285 and 286. The drive sprocket 272 is mounted on a shaft 287 which is provided with a sprocket 288 which is coupled with a sprocket 289 mounted on a shaft by a belt 290 which also passes over an idler tension gear 291. The drive sprocket 276 is driven by the shaft 287 through the intermediary of gears 293 and 294. The sprocket 288 has a smaller diameter than the sprocket 289 so that the belts 268 and 269 are driven faster than the belts 270 and 271. Since the strip is locked between the belts at all times, it moves faster as its upper end than its lower end with the result that it is longitudinally compressed to tightly grasp and enclose the solder sleeves 45. The compressed strip leaving the mechanism shown is provided with a slack loop 295 and is then fed to another guide 296 from whence it is carried to inspecting, counting, cutting and rolling equipment.

FIGURES 29A–29J, and 30–35 show the manner in which the strip is corrugated before being passed through the turntable 37 where it receives the solder sleeves 45. FIGURES 29A–29J show schematically the manner in which this is accomplished. FIGURE 29A shows the position of a dieblock 300, a block 301 and a pair of die needles 302 and 303 at the end of one operation and the beginning of the next, that is, at 360° or 0° of the rotation of a shaft which drives various cams and their cooperating mechanisms in the manner shown in the succeeding figures. As can be seen, the die block 300 is provided with a pair of punches 304 and 305 which cooperate with corresponding recesses in the block 301 to form the pockets or corrugations in the strip. The die block 300 is also provided with a flattener 306 which cooperates with a ridge 307 on the block 301 and with the die needles 302 and 303 to pinch and flatten the strip in the areas intermediate the pockets so that the opening of the pockets has a width less than their maximum width. The punches 304 and 305 and their cooperating recesses in the block 301 are, of course, constructed so that the pockets formed in the strip will have shoulders in appropriate places to correspond with the configuration of the solder sleeve 45 such as that shown in FIGURE 24A at position s.

FIGURE 29B shows the position of the various elements after the shaft has rotated 50°. As can be seen, the die needles 302 and 303 have been moved apart horizontally but the remainder of the mechanism remains in the closed position. At 90° rotation, shown in FIGURE 29C, the die needles 302 and 303 have been moved vertically out of the corrugated strip but the remainder of the mechanism is still closed. In FIGURE 29D, the die block 300 has been raised out of the block 301. At 150° rotation, shown in FIGURE 29E, the block 301 has been moved forward relative to the die block 300 to bring another portion of the as yet unformed strip under the die block 300.

In FIGURE 29F, the elements are shown after 190° rotation of the shaft. As can be seen, the blocks 300 and 301 are still separated but the die needles 302 and 303 have been moved downwardly into the next two pockets formed in the strip. At 220° rotation, shown in FIGURE 29G, the block 301 moves downwardly clear of the strip. At 250° rotation, shown in FIGURE 29H, the block 301 has retreated back to the original position shown in FIGURE 29A. After 280° of rotation, shown in FIGURE 29I, the block 301 has moved vertically back to the position shown in FIGURE 29A. As shown in FIGURE 29J, between 330° and 360° of rotation the die block 300 moves down towards the block 301 so that the punches 304 and 305 enter the block 301 to respectively hold the strip and form another pocket in it. At this same time, the die needles 302 and 303 move together and the flattener 306 descends on the bubble formed between the die needles 302 and 303 and flattens it in the manner shown in FIGURE 29A.

FIGURES 30 through 35 show the mechanism by which the operations shown in FIGURES 29A–29J are performed. The block 301 is mounted on a lever 308 which is pinned to a bell crank 309. The lever 308 is provided with a cam follower 310 which cooperates with a cam 311 which is one of a series of cams mounted on a shaft 312 which is rotated by any conventional means such as an electric motor. The lever 308 is urged in the counterclockwise direction around the pin 313 by a spring 314.

The bell crank 309 is pivotally mounted on a shaft 315 and urged in the counterclockwise direction by a spring 316. The bell crank 309 is also provided with a cam follower 317 which cooperates with a second cam 318 mounted on the shaft 312. A lever 319 is pivotally mounted on the shaft 315 and is urged in the upward direction by a spring 320. The lever 319 is provided with a cam follower 321 which cooperates with a third cam 322 mounted on the shaft 312.

The other end of the lever 319 is provided with a slot 323 which receives a pin 324 on a linkage member 325 that slides vertically in a slide 326. The member 325 carries the die block 300 on the upper end thereof. As can be seen, the punch 305 is fixedly mounted in the block 300 but the punch 304 is slidably mounted within the block 300 and urged downward by a spring 327. This construction permits the punch 304 to enter into the already formed pocket in the corrugation and hold it in place as the punch 305 corrugates the next section of the strip.

As shown in FIGURE 31, the die needle 302 extends across a cutout portion 330 formed in a plate 331. Similarly, the die needle 303 extends across the cutout portion 332 of a plate 333. The plates 331 and 333 are pinned to a lever 334 by pins 335 and 336 respectively. The lever 334 is pivoted about the shaft 315 and is urged in the clockwise direction by a spring 337. The lever 334 carries a cam follower 338 which cooperates with another cam 339 carried by the shaft 312.

The upper end of the plate 331 is connected to a disc 340 by a rod 341. The disc 340 is rigidly attached to a lever 342, the other end of which is carried on a shaft 343. A cam follower 344 is mounted on the shaft 343 and cooperates with a further cam 345 carried by the shaft 312. The upper end of the plate 333 is connected by a rod 346 to a lever 347 whose other end is also carried by the shaft 343. A spring 348 urges the lever 342 downwardly and the cam follower 344 against the cam 345. A pair of fixed guide plates 349 and 350 are provided to restrain the disc 340 against lateral movement.

For purposes of simplicity, the shapes of the various cams have not been illustrated, but it is believed that their requirements will be obvious to those skilled in the art. As can be seen in FIGURE 32, when the shaft is in its 0° position, the cam 345 will cause the cam follower 344 to ride upwardly to a position where the levers 342 and 347 are approximately horizontal with the result that the plates 331 and 333 and hence the die needles 302 and 303 are forced together. FIGURE 31 shows the position of the elements when the shaft 312 reaches 50°. The cam 345 has caused the cam follower 344 to move downwardly with the result that the plates 331 and 333 carrying the die needles 302 and 303 are moved apart. As the shaft 312 continues to rotate, the diameter of the cam 339 decreases so that the lever 334 moves upwardly to the position shown in phantom in FIGURE 34 which occurs at 120°. FIGURE 33 shows the position of all of the die members at 50°. The movements of the die block 300 and the block 308 and their associated mechanisms is believed obvious from FIGURES 29A through 29J. Extended discussion is therefore thought to be unnecessary.

From the foregoing description, it can be seen that apparatus has been provided for automatically fabricating solder sleeves from a plurality of plastic sleeves and a roll of solder. In addition, the apparatus provides equipment for corrugating a strip of packaging material and causing the completed solder sleeves to be inserted in the strip which is then compressed to firmly hold the solder sleeves. The apparatus thus permits the rapid, efficient and economical fabrication of solder sleeves, already packaged and ready for shipment.

The invention may be embodied in other specific forms not departing from the spirit or central characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. Apparatus for automatically forming connectors comprising a heat recoverable tubular member having a fusible ring positioned therein from a plurality of heat recoverable tubular members and a strip of fusible material comprising:

a carrier for carrying a plurality of sets of cooperating upper and lower mandrels;

drive means for moving said carrier to sequentially advance each of said sets of mandrels to a plurality of positions;

means at a first of said positions to wrap a portion of said strip around one of the mandrels of each set to form a ring when said set is advanced to said first position;

means to supply said strip to said means at said first position;

means at a second of said positions to position one of said tubular members on each set of mandrels over said ring when said set is advanced to said second position;

means to supply said tubular members to said means at said second position;

means at a third of said positions to heat each tubular member advanced thereto by a set of mandrels to above its heat recovery temperature to cause said tubular member to recover around said ring and said mandrels of said set; and means at a fourth of said positions to remove the heat recovered tubular member and ring positioned therein from each set of mandrels advanced thereto.

2. The apparatus of claim 1 wherein said means at said first position includes means for advancing a metered amount of said strip to said mandrel and severing said metered amount from the remainder of said strip.

3. The apparatus of claim 2 wherein die means are provided for wrapping said metered amount of fusible material around said mandrel, said die means being opened and closed in synchronism with the advancement of said mandrel to said first position.

4. The apparatus of claim 1 wherein said means at said second position comprise means movable in synchronism with said carrier, said synchronized means being operable to suspend said tubular member between the mandrels of a set, and wherein means are provided for moving said mandrels into the opposite ends of said tubular member.

5. The apparatus of claim 4 wherein said means at said second position comprise a disc passing between the mandrels of a set and having a plurality of peripheral notches formed therein to receive one of said tubular members, a dog positioned adjacent each of said notches, spring means biasing each of said dogs into its respective notch to force said tubular member out of said notch, first guide means positioned about said disc except where said disc passed between said mandrels to retain the tubular member in each notch, and second guide means positioned to cooperate with each of said dogs when said dog forces a tubular member out of its respective notch to suspend said tubular member between said mandrels.

6. The apparatus of claim 1 wherein said mandrels are movable relative to said carrier and wherein means are provided to move said mandrels into said tubular member at said second position and out of said tubular member at said fourth position.

7. The apparatus of claim 6 wherein said mandrel moving means comprise a pair of plates, one of said plates being engageable with said upper mandrels and the other of said plates being engageable with said lower mandrels, and means for reciprocating said plates.

8. The apparatus of claim 7 wherein said means for reciprocating said plates comprises a cam, a cam follower mounted on one of said plates, means rigidly connecting said plates together, and means for driving said cam.

9. The apparatus of claim 7 wherein each of said plates is provided with a cam track for cooperating with said upper and lower mandrels to vary the vertical position of said mandrels relative to said carrier at the various positions to which the carrier is moved.

10. The apparatus of claim 1 wherein said means at said fourth position comprises a strip of packaging material having a plurality of pockets formed therein for receiving individual connectors and means synchronized with the advancement of said sets of mandrels to position one of said pockets in the path of a set of mandrels when said set reaches said fourth position.

11. The apparatus of claim 10 wherein means are provided for forming said pockets in a strip of flat packaging material, said pockets conforming to the shape of said connectors.

12. The apparatus of claim 10 wherein means are provided for longitudinally compressing said strip of packaging material after said connectors have been positioned in the pockets thereof.

13. The apparatus of claim 1 wherein means are provided for forming said strip of fusible material from a round wire thereof comprising flattening means for flattening said wire into a strip and perforating means for forming perforations in said strip.

14. Apparatus for automatically forming solder sleeves comprising a heat recoverable tubular member having a solder ring positioned therein from a plurality of heat recoverable tubular members and a strip of solder comprising:

a turntable for carrying a plurality of sets of cooperating upper and lower mandrels;

drive means for intermittently moving said turntable to sequentially advance each of said sets of mandrels to a plurality of positions;

first means at a first of said positions to wrap a metered portion of said strip around the lower mandrel of each set to form a solder ring when said set is advanced to said first position, said first means including means for severing said portion from the remainder of said strip;

means to supply said strip to said first means;

second means at a second of said positions to position one of said tubular members on each set of mandrels over said ring when said set is advanced to said second position, said second means comprising rotating means driven by said drive means in synchronism with said turntable whereby said rotary means present a tubular member to said turntable upon each intermittent advancement of said turntable;

means to supply said tubular members to said second means;

third means at a third of said positions to supply heat to each tubular member advanced thereto by a set of mandrels sufficient to cause its heat recovery but insufficient to melt the solder ring positioned therein whereby said tubular member recovers around said ring and said mandrels of said set;

fourth means at a fourth of said positions to cool said tubular members; and fifth means at a fifth of said positions to remove the heat recovered tubular member and ring positioned therein from each set of mandrels advanced thereto.

15. The apparatus of claim 14 wherein said mandrels are vertically movable relative to said turntable.

16. The apparatus of claim 15 wherein a pair of plates each having a cam track mounted thereon cooperate with said upper and lower mandrels respectively to vertically move them relative to said turntable, and wherein means are provided for vertically reciprocating said plates, said plates and said cam tracks causing said mandrels to move into said tubular member at said second position, remain in said tubular member at said third and fourth positions, and move out of said tubular member at said fifth position.

17. The apparatus of claim 16 wherein said rotating means comprises a disc passing between the mandrels of a set and having a plurality of peripheral notches formed therein to receive one of said tubular members, a dog positioned adjacent each of said notches, spring means biasing each of said dogs into its respective notch to force said tubular member out of said notch, first guide means positioned about said disc except where said disc passed between said mandrels to retain the tubular member in each notch, and second guide means positioned to cooperate with each of said dogs when said dog forces a tubular member out of its respective notch to suspend said tubular member between said mandrels.

18. The apparatus of claim 17 wherein said means to supply said tubular means comprises a plunger for driving a tubular member into a notch of said disc each time said disc is rotated.

19. The apparatus of claim 16 wherein said means at said fifth position comprises a strip of packaging material having a plurality of pockets formed therein for receiving individual solder sleeves and means synchronized with the advancement of said sets of mandrels to position one of said pockets in the path of a set of mandrels when said set reaches said fifth position.

References Cited

UNITED STATES PATENTS

| | | | |
|---|---|---|---|
| 2,269,658 | 1/1942 | George et al. | 29—33.8 |
| 3,173,190 | 3/1965 | Brown | 29—33.9 |
| 3,186,061 | 6/1965 | Beyer | 29—33.9 |

RICHARD H. EANES, JR., *Primary Examiner.*